(12) United States Patent
Sohmshetty et al.

(10) Patent No.: US 12,023,722 B2
(45) Date of Patent: Jul. 2, 2024

(54) STAMPING LINE DEFECT QUALITY MONITORING SYSTEMS AND METHODS OF MONITORING STAMPING LINE DEFECTS

(71) Applicant: Ford Global Technologies, LLC, Dearborn, MI (US)

(72) Inventors: Raj Sohmshetty, Canton, MI (US); Tanveer Shaik, Farmington Hills, MI (US); Elizabeth Bullard, Royal Oak, MI (US); Francis Maslar, Grosse Ile, MI (US); Brodie Schultz, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 343 days.

(21) Appl. No.: 17/078,768

(22) Filed: Oct. 23, 2020

(65) Prior Publication Data

US 2022/0126345 A1 Apr. 28, 2022

(51) Int. Cl.
*B21C 51/00* (2006.01)
*G01N 21/88* (2006.01)
*G06T 7/00* (2017.01)

(52) U.S. Cl.
CPC ......... *B21C 51/00* (2013.01); *G01N 21/8851* (2013.01); *G06T 7/0004* (2013.01);
(Continued)

(58) Field of Classification Search
CPC ............... B21C 51/00; G01N 21/8851; G01N 21/8854; G01N 21/8861; G01N 21/8864;
(Continued)

(56) References Cited

U.S. PATENT DOCUMENTS 5,165,101 A * 11/1992 Cox ..................... G06K 9/6217
348/92
7,764,823 B1 * 7/2010 Jurich ................ G01N 21/9515
382/152

(Continued)

FOREIGN PATENT DOCUMENTS

| CN | 105069807 | 3/2018 |
| CN | 108280823 | 7/2018 |

(Continued)

OTHER PUBLICATIONS

Li, et al., Real-Time Detection Method for Surface Defects of Stamping Parts Based on Template Matching, IOP Conference Series: Earth and Environmental Science, 2019, pp. 1-8, vol. 252, IOP Publishing Ltd.

*Primary Examiner* — Jun S Yoo
(74) *Attorney, Agent, or Firm* — Burris Law, PLLC

(57) ABSTRACT

A method of inspecting stamped blanks on a stamping line includes identifying at least one target defect location for a given stamped blank configuration where a unique defect type is associated with each of the at least one target defect locations. One or more images of each of the least one identified target defect locations on blanks stamped per the given stamped blank configuration are acquired with one or more cameras assigned to each of the identified target defect locations. The method includes analyzing the one or more images of each of the least one identified target defect locations and detecting if the unique defect type associated with each of the at least one target defect locations is present. Also, each unique defect type is identified with a corresponding unique defect identification algorithm.

20 Claims, 10 Drawing Sheets

(52) U.S. Cl.
CPC ............... *G01N 2021/8887* (2013.01); *G06T 2207/20081* (2013.01); *G06T 2207/30164* (2013.01)

(58) Field of Classification Search
CPC ............ G01N 21/8867; G01N 21/8877; G06T 7/0002; G06T 7/0004; G06T 2207/30136; G06T 2207/30164; G06T 2207/20081; G06T 2207/20076
See application file for complete search history.

(56) References Cited

U.S. PATENT DOCUMENTS

| | | | |
|---|---|---|---|
| 10,869,644 B2 * | 12/2020 | Zhao | A61B 6/032 |
| 2007/0067134 A1 * | 3/2007 | Borowicz | G06T 7/0004 702/127 |
| 2018/0300865 A1 * | 10/2018 | Weiss | G06T 7/10 |
| 2019/0236772 A1 * | 8/2019 | Cho | G06N 3/08 |
| 2020/0013156 A1 * | 1/2020 | Weiss | G06K 9/6232 |

FOREIGN PATENT DOCUMENTS

| | | | | |
|---|---|---|---|---|
| CN | 108593666 | | 9/2018 | |
| WO | WO-8605588 A | * | 9/1986 | ............. G01F 1/661 |

* cited by examiner

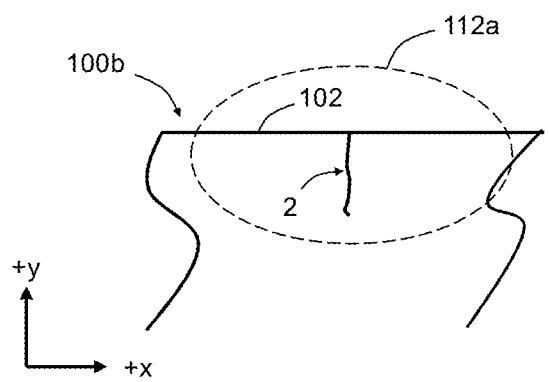
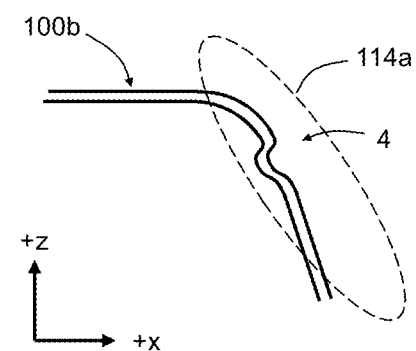
FIG. 1A  FIG. 1B
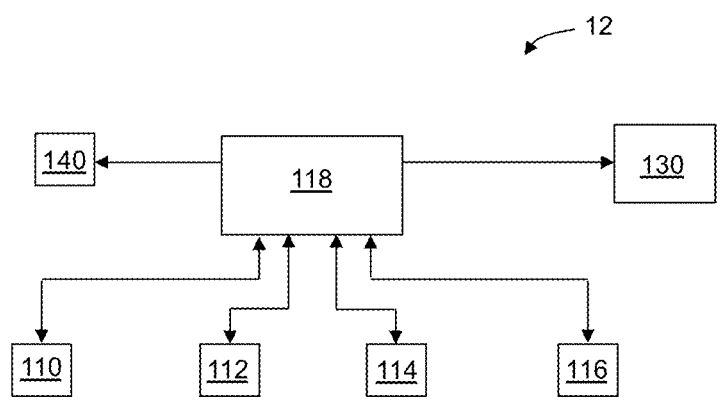
FIG. 2

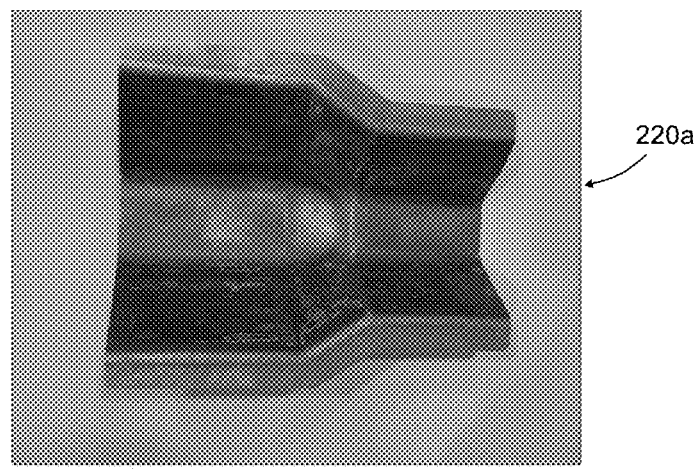
FIG. 6A
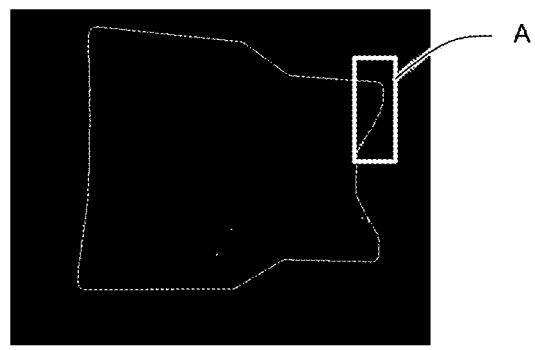
FIG. 6B
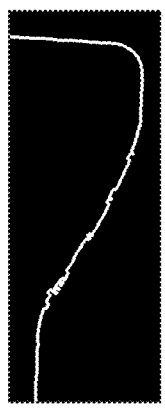 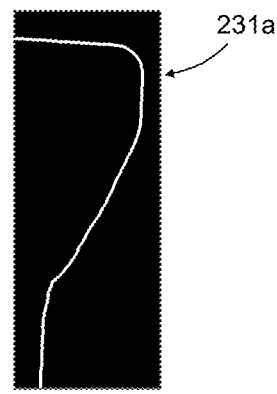
FIG. 6C       FIG. 6D

STAMPING LINE DEFECT QUALITY MONITORING SYSTEMS AND METHODS OF MONITORING STAMPING LINE DEFECTS

FIELD

The present disclosure relates to metal stamping and particularly to detecting defects on metal stampings on a metal stamping line.

BACKGROUND

The statements in this section merely provide background information related to the present disclosure and may not constitute prior art.

Stamping of pieces of metal sheet material (commonly referred to as "blanks") provides an economical process for forming parts and components used for the assembly of airplanes, agricultural equipment, small and major appliances, power tools, and motor vehicles, among others. And stamped blanks are typically inspected for defects such as split edge defects, wrinkle defects, springbok defects, and dimensional noncompliance defects, among others.

The present disclosure addresses the issues of inspecting stamped blanks for defects among other issues related to stamping blanks.

SUMMARY

This section provides a general summary of the disclosure and is not a comprehensive disclosure of its full scope or all of its features.

In one form of the present disclosure, a method of inspecting stamped blanks on a stamping line includes identifying at least one target defect location for a given stamped blank configuration where a unique defect type is associated with each of the at least one target defect locations, and acquiring one or more images of each of the least one identified target defect locations on blanks stamped per the given stamped blank configuration. The one or more images are acquired with one or more cameras assigned to each of the identified target defect locations and as the stamped blanks move along the stamping line. The method includes analyzing the one or more images of each of the least one identified target defect locations and detecting if the unique defect type associated with each of the at least one target defect locations is present. Also, each unique defect type is identified with a corresponding unique defect identification algorithm.

In some variations, identifying target defect locations for the given stamped blank configuration includes identifying the target defect locations based on a set of data comprising data populated from at least one of computer-aided engineering simulations, data populated from prototype stamping trials of blanks stamped per the given stamped blank configuration, data received from real time sensors during stamping of blanks per the given stamped blank configuration, and data indicative of physical properties of blanks being stamped per the given stamped blank configuration, mechanical properties of blanks being stamped per the given stamped blank configuration, and geometric dimensions of the given stamped blank configuration.

In at least one variation, the method further includes assigning the one or more cameras to the identified target defect locations as a function of information on a plurality of cameras assigned to the stamping line. For example, in some variations the information on the plurality of cameras includes locations of and specifications on the plurality of cameras on the stamping line.

In at least one variation, the method further includes setting a camera angle, a focus, and a zoom for each of the assigned one or more cameras. And in some variations, the method further includes displaying the defects detected at the least one identified target defect location on a display screen.

In at least one variation, the method further includes updating a defect database. And in some variations, the method further includes identifying a defect type and a defect location on blanks stamped per the given stamped blank configuration and having at least one defect.

In at least one variation, the identified target defect locations comprise a first defect location with a first type of defect and a second defect location different than the first location with a second type of defect different than the first type of defect. In such variations, the one or more cameras can include at least two cameras with a first camera assigned to and taking images of the first defect location and a second camera assigned to and taking images of the second defect location. Also, the method can further include a first defect type identification sub-system assigned to the first defect location and a second defect type identification sub-system assigned to the second defect location. And the first defect type identification sub-system includes the first camera and a first unique defect identification algorithm and the second defect type identification sub-system includes the second camera and a second unique defect identification algorithm different than the first unique defect identification algorithm.

In some variations, the method further includes training each unique defect identification algorithm for the corresponding unique defect type. For example, in at least one variation the method includes training a first algorithm for a split edge defect type associated with the at least one identified target defect location corresponding to a split edge target location and training a second algorithm for a wrinkle defect type associated with a target location different than the split edge target location.

In at least one variation the method further includes a split edge defect identification algorithm configured to execute a plurality of steps on an acquired image of the split edge target location. In such variations the split edge defect identification algorithm can execute the steps of bilateral smoothing, image denoising, extraction of saturation dimension, binary thresholding, morphological transformation, and/or edge and contour identification. Also, in such variations the method includes identifying a split edge defect on one of the stamped blanks moving along the stamping line, updating a defect database with a location of the identified split edge defect on the stamped blank, and displaying the location of the identified split edge defect on the stamped blank on a display screen on the stamping line.

In another form of the present disclosure, a method of inspecting stamped blanks on a stamping line includes identifying a target split edge defect location for stamped blanks moving on the stamping line and stamped per a given stamped blank configuration. Also, one or more images of the target split edge defect location on at least a subset of the stamped blanks using one or more cameras assigned to the identified target split edge defect location as the stamped blanks move along the stamping line and through a field of view of the one or more cameras are acquired. Then, the one or more images of the target split edge defect location are analyzed and a split edge defect at a target split defect location on one of the stamped blanks is detected using a split edge defect identification algorithm.

In some variations, the split edge defect identification algorithm is configured to detect the split edge defect by executing a plurality of steps on an acquired image. In at least one variation the plurality of executed steps on the acquired image include bilateral smoothing, image denoising, extraction of saturation dimension, binary thresholding, morphological transformation, and/or edge and contour identification. And in at least one variation the method further includes identifying a target wrinkle defect location for the stamped blanks moving on the stamping line and stamped per the given stamped blank configuration. Also, one or more images of the target wrinkle defect location on at least another subset of the stamped blanks using other cameras assigned to the identified target wrinkle defect location as the stamped blanks move along the stamping line and through a field of view of the other cameras are acquired and analyzed. Particularly, the one or more images of the target wrinkle defect location are analyzed, and in some variations a wrinkle defect at a target wrinkle location on one of the stamped blanks is detected using a wrinkle defect identification algorithm different than the split edge defect identification algorithm.

In still another form of the present disclosure a method of inspecting stamped blanks on a stamping line includes identifying a target split edge defect location for stamped blanks moving on the stamping line and stamped per a given stamped blank configuration, and acquiring one or more images of the target split edge defect location on at least a subset of the stamped blanks using one or more cameras assigned to the identified target split edge defect location as the stamped blanks move along the stamping line and through a field of view of the one or more cameras. In some variations the one or more images of the target split edge defect location are analyzed and a split edge defect at a target split defect location is detected on one of the stamped blanks using a split edge defect identification algorithm.

In some variations, the split edge defect identification algorithm detects the split edge defect by executing a plurality of steps on the acquired image. For example, in at least one variation the split edge defect identification algorithm executes bilateral smoothing, image denoising, extraction of saturation dimension, binary thresholding, morphological transformation, and/or edge and contour identification on the acquired image.

In at least one variation the method further includes identifying a target wrinkle defect location for the stamped blanks moving on the stamping line and stamped per the given stamped blank configuration. And in such a variation the method can include acquiring one or more images of the target wrinkle defect location on at least another subset of the stamped blanks using other cameras assigned to the identified target wrinkle defect location as the stamped blanks move along the stamping line and through a field of view of the other cameras. The one or more images of the target wrinkle defect location are analyzed and a wrinkle defect at a target wrinkle location on one of the stamped blanks is detected using a wrinkle defect identification algorithm different than the split edge defect identification algorithm.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1A show one type of defect monitored by the system in FIG. 1;

FIG. 1B shows another type of defect monitored by the system in FIG. 1;

FIG. 2 is a system diagram for an inspection station according to the teachings of the present disclosure;

FIG. 6A is an acquired image of a stamped blank;

FIG. 6B is the acquired image in FIG. 6A after being subjected to a bilateral filter;

FIG. 6C is an enlarged view of area 6C in FIG. 6B;

FIG. 6D is the image in FIG. 6C after being subjected to a smoothing filter;

Figure 1:
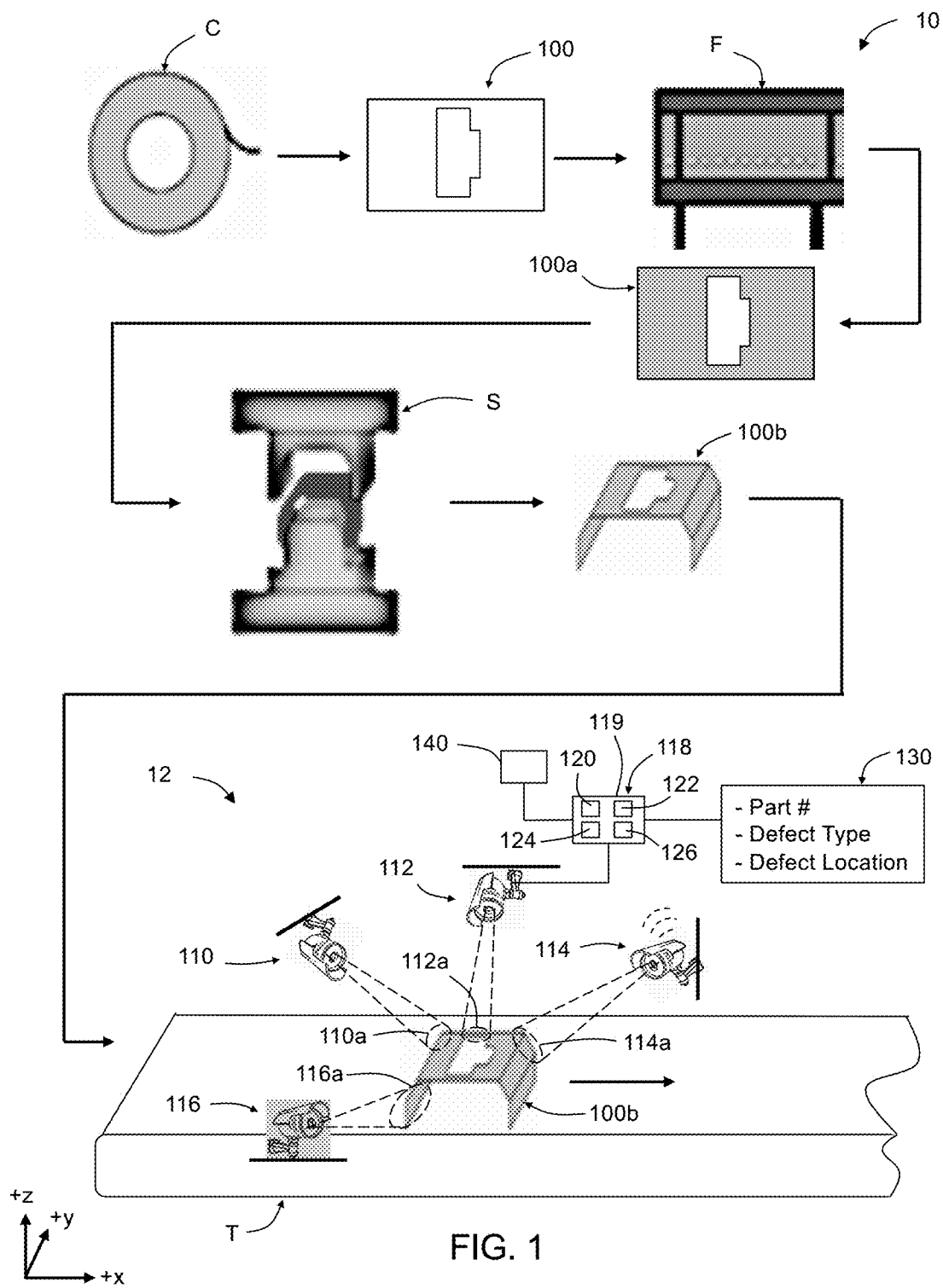
FIG. 1 shows a stamping line for stamping metal blanks with a stamped blank defect monitoring system according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1 a stamping line 10 with a defect monitoring station 12 (also referred to herein as "defect inspection station 12" or simply as "inspection station 12") is shown. The stamping line includes a coil 'C' of a metallic material (e.g., steel) from which metal blanks 100 are formed. In at least one variation the metal blanks 100 are heated in a furnace 'F' to form heated blanks 100a before being stamped (e.g., hot stamped) according to a given stamped blank configuration with a stamping press 'S' to form stamped blanks 100b (per the given stamped blank configuration). In other variations, the metal blanks 100 are not heated in the furnace F before being stamped into the stamped blank 100b per the given stamped blank configuration. The stamped blanks 100b proceed to the defect inspection station 12 for monitoring or inspection for defects.

Referring to FIGS. 1 and 2, the inspection station 12 includes at least one camera, for example a plurality of cameras 110, 112, 114, 116 (referred to herein collectively as "cameras 110-116), in communication with at least one computer 118 having at least one processor 119 a nontransitory computer-readable medium with instructions (algorithms) that are executable by the processor. In some variations the computer 119 is an edge computer that processes images such that the images are not processed in the "cloud". However, and unlike conventional monitoring or inspection systems that acquire images of an entire exposed surface of a stamped blank 100b and then analyze the acquired images for numerous defects, each of the cameras 110-116 is directed to a specific location or area on the stamped blanks 100b where a particular type of defect is known to occur (referred to herein as a "target defect location"). That is, using information and/or data from computer aided engineering (CAE) simulations, prototype trials, data from real time sensors, and/or the part itself, among others, where a particular type of defect (also referred to herein as a "unique defect type") will be present (i.e., when present) on a stamped blank can be determined.

For example, camera 110 in FIG. 1 is directed to and acquires one or more images of a target defect location 110a where a first unique defect type (e.g., a thinning defect) is known to occur as the stamped blank 100b moves past or within the field of view of camera 110, camera 112 is directed to and acquires one or more images of a target defect location 112a where a second defect type (e.g., a split edge defect) is known to occur, camera 114 is directed to and acquires one or more images of a target defect location 114a where a third defect type (e.g., a wrinkle defect) is known to occur, and camera 116 is directed to and acquires one or more images of a target defect location 116a where a fourth defect type (e.g., a springback defect) is known to occur. In the alternative, or in addition to, two or more of the example target defect locations 110a-116a can be where the same type of defect is known to occur and/or one or more of the cameras 110-116 can scan and acquire one or more images from multiple (two or more) target defect locations 110a-116a. In some variations the stamped blank 110b is transported on a conveyor 'T' past or within the field of view of cameras 110-116, while in other variations a robot transports stamped blank 110b past or within the field of view of cameras 110-116.

Referring now to FIGS. 1A-1B, an example of a split edge defect 2 adjacent or extending from an edge 102 of the stamped blank 100b in FIG. 1 at the target defect location 112a (i.e., the target slit edge defect location 112a) is shown in FIG. 1A and an example of a wrinkle defect 4 proximate to a corner of the stamped blank 100b at the target defect location 114a (i.e., the target wrinkle defect location 112a) is shown in FIG. 1B. Other non-limiting examples of defect types include surface anomalies, irregular edges (e.g., bent edges, burrs, amount others), and dimensional noncompliance (e.g., location and/or dimension of holes, lots, bends/contours, among others).

Still referring to FIG. 1, each of the cameras 110-116 is in communication with and transmit acquired images for a unique defect type to the at least one processor 119. The at least one processor 119 is configured to receive the acquired images from the cameras 110-116 and analyze the images by executing a particular or unique defect type algorithm on an and as a function of which target defect location the image was acquired. For example, and with reference to the unique defect types and target defect locations mentioned above, camera 110 is in communication with the computer 118 and images acquired by camera 110 are assigned to and analyzed by an algorithm 120 configured to analyze acquired images from the target defect location 110a for the detection of thinning defects, and camera 112 is in communication with the computer 118 and images acquired by camera 112 are assigned to and analyzed by an algorithm 122 configured to analyze acquired images from the target defect location 112a for the detection of split edge defects. Also, camera 114 is in communication with the computer 118 and images acquired by camera 110 are assigned to and analyzed by an algorithm 124 configured to analyze acquired images from the target defect location 114a for the detection of wrinkle defects, and camera 116 is in communication with the computer 118 and images acquired by camera 110 are assigned to and analyzed by an algorithm 126 configured to analyze acquired images from the target defect location 116a for the detection of springback defects. In some variations, the algorithms 120-126 are each uniquely configured to analyze the acquired images for a particular or unique type of defect. For example, the algorithm 120 is particularly or uniquely configured to analyze acquired images from the target defect location 110a for the detection of thinning defects, the algorithm 122 is uniquely configured to analyze acquired images from the target defect location 112a for the detection of split edge defects, the algorithm 124 is uniquely configured to analyze acquired images from the target defect location 114a, and/or the algorithm 126 is uniquely configured to analyze acquired images from the target defect location 116a for the detection of springback defects.

In the event that a defect is identified by one of the algorithm 120-126, a report of the analysis is generated and provided on a display 130. And in some variations of the present disclosure a defect database 140 containing data on defect types, defect locations, defect types per given stamped blank configuration, defect locations per given stamped blank configuration, among others, is updated. And unlike conventional monitoring or inspection systems that are configured and/or trained for a particular stamped blank (i.e., a given stamped blank configuration) of a stamped blank 100b, each of the algorithm 120-126 is configured and/or trained for a unique defect type, not a given stamped blank configuration.

It should be understood that such a shift or difference in defect inspection methodology (i.e., focusing, training and inspecting for a defect type rather focusing, training, and inspecting an entire stamped blank) provides a number of benefits and advantages. For example, training of conventional monitoring or inspection systems includes providing stamped blank samples (for the given stamped blank configuration) that have all possible defects and obtaining such samples can prove difficult. In contrast, the inspection systems according to the teachings of the present disclosure are trained for unique defect types (e.g., a split edge defect), and once trained, can be used on a plurality of different stamped blank configurations to inspect for and identify the unique defect types. Also, conventional monitoring or inspection systems lack portability, i.e., such system cannot be easily moved from one stamping line to another stamping line, and yet a given stamping line where such a system is installed may not need monitoring all the time. In contrast, since the inspection systems according to the teachings of the present disclosure are not trained for a particular given stamped blank configuration can be easily moved and used from one stamping line to another stamping line. And conventional monitoring or inspection systems are typically provided by a single vendor and have high initial investment costs associated with equipment such as proprietary 2D cameras, 3D cameras, laser scanners, and high performance computers, among others. In contrast, such that switching and choosing to use another system can be cost prohibitive. In contrast, the inspection systems according to the teachings of the present disclosure can use equipment (e.g., cameras and/or computers) already available on a stamping line.

Figure 3:
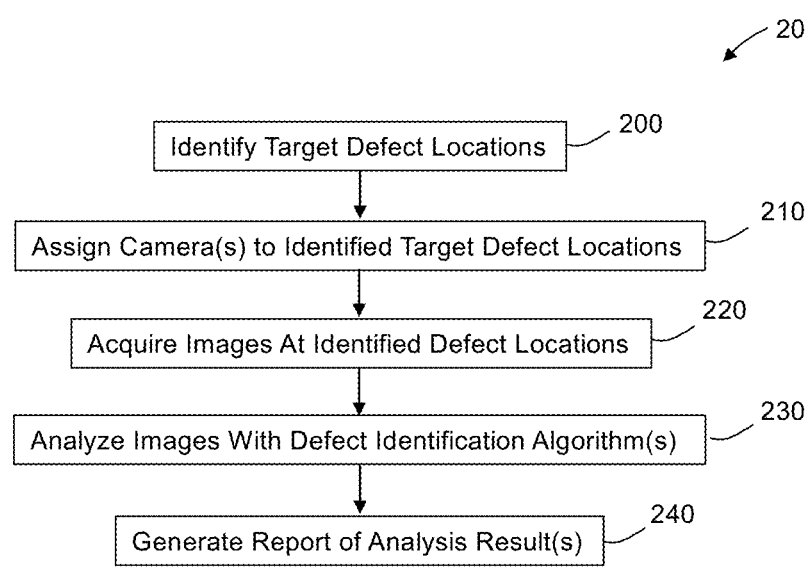
FIG. 3 is a flowchart for a method of monitoring defects in stamped blanks on a stamping line according to one form of the present disclosure.

Referring now to FIG. 3 a flowchart for a method 20 of using the inspection system 12 according to one form of the present disclosure is shown. Particularly, a method 20 of inspecting stamped blanks on a stamping line includes identifying target defect locations for a given stamped blank configuration at 200 and assigning one or more cameras to the identified target defect locations at 210. The one or more cameras acquire images at the identified defect locations of stamped blanks moving past or within the field of view of the one or more cameras at 220, the acquired images are analyzed with one or more defect identification algorithms at 230, and a report of the results of the analysis is generated at 240.

Figure 4:
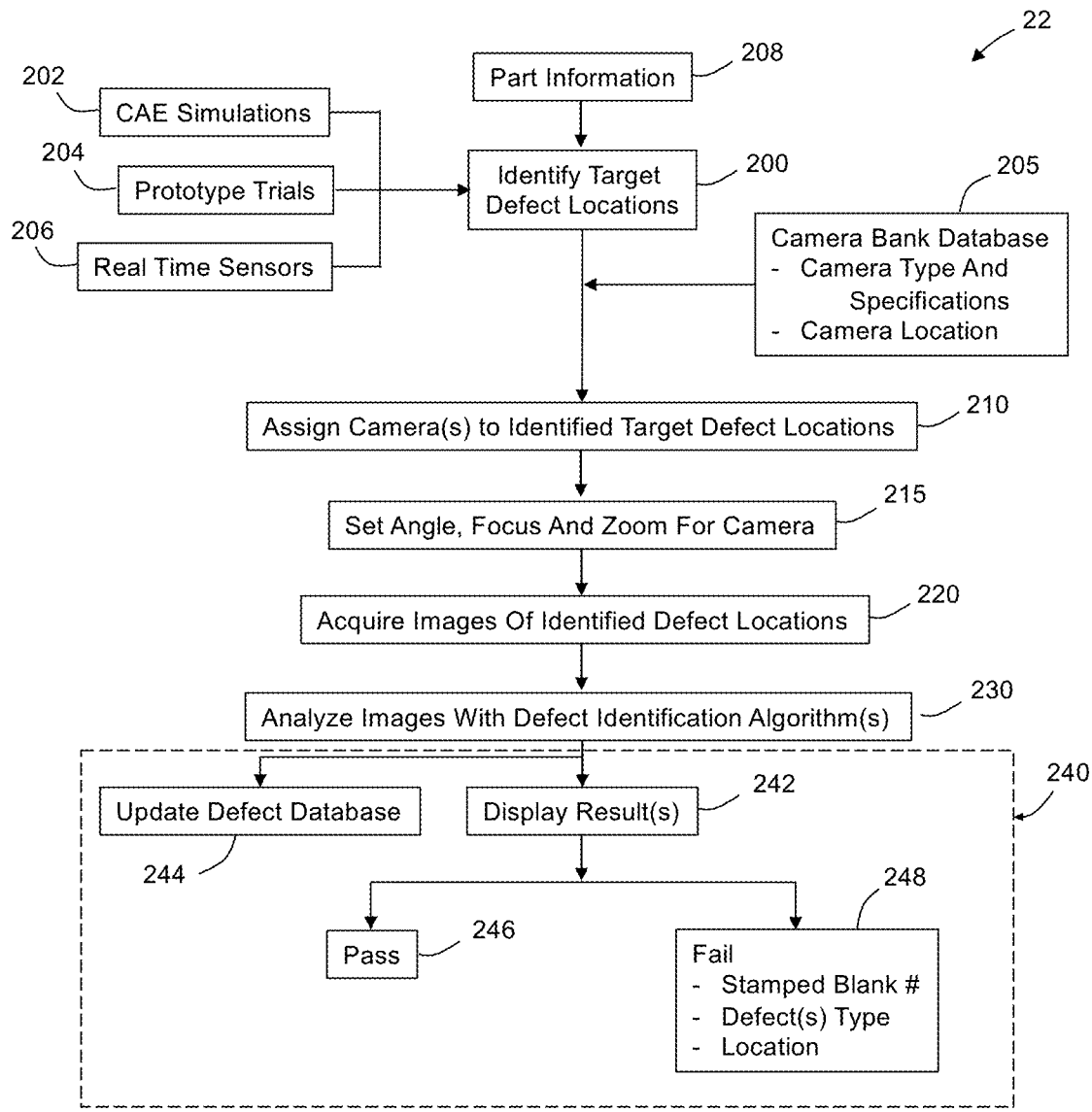
FIG. 4 is a flowchart for a method of monitoring defects in stamped blanks on a stamping line according to another form of the present disclosure.

Referring now to FIG. 4, a method 22 of inspecting stamped blanks on a stamping line according to another form of the present disclosure includes identifying target defect locations for a given stamped blank configuration at 200 as in method 20. In addition, the target defect locations are identified as a function of input from at least one of CAE simulations of a given stamped blank configuration at 202, prototype trials of blanks stamped per the given stamped blank configuration at 204, real time sensors on the stamping line at 206, and information on the part itself at 208. Non limiting examples of real time sensor data or input include vibration sensors and sensors monitoring the production equipment (e.g., the stamping press S), among others, and non-limiting examples of information on the part itself include defect data from similar shaped stamped blanks fabricated from a different material and defect data on similar shaped parts fabricated from a similar material, among others.

Based on the number and location of the identified target defect locations for the given stamped blank configuration, one or cameras are assigned to each of the identified target defect locations at 210. In addition, the number and type of cameras of assigned to the identified target defect locations is a function of information provided from a camera bank database at 205. The camera bank database includes information on cameras that are available for inspecting stamped blanks on the stamping line, such as camera type (e.g., 2D area scanning camera, 2D line scanning camera, 3D camera, laser scanning camera, among others) of each available camera, specifications of each available camera, where each available camera is located on the stamping line, among others.

The one or more cameras are configured for the identified target defect location to which they have been assigned at 215. In some variations, configuration of the one or more cameras can include setting camera parameters such as angle, focus and/or zoom, among others, for each of the one or more cameras. As blanks stamped per the given stamped blank configuration move past or within a field of view of the one or cameras, images are acquired of the assigned identified defect locations at 220 and the images are analyzed with unique defect identification algorithms at 230 to determine whether or not a defect is present (detected) at each of the identified target defect locations on each of the stamped blanks. A report of the results of the analysis is generated at 240 and the report includes displaying the results at 242 and updating a defect database at 244. In some variations displaying the results at 242 includes displaying a "Pass" result at 246 when no defects are detected on a given stamped blank and a "Fail" result at 248 when at least one defect is detected on a given stamped blank. In at least one variation, displaying the "Fail" result at 248 includes displaying information on the defect or the stamped blank such as the number of the stamped blank number (i.e., which stamped blank moving along the stamping line has the defect), the type of defect detected, and the location of the defect on the stamped blank, among others.

Figure 5:
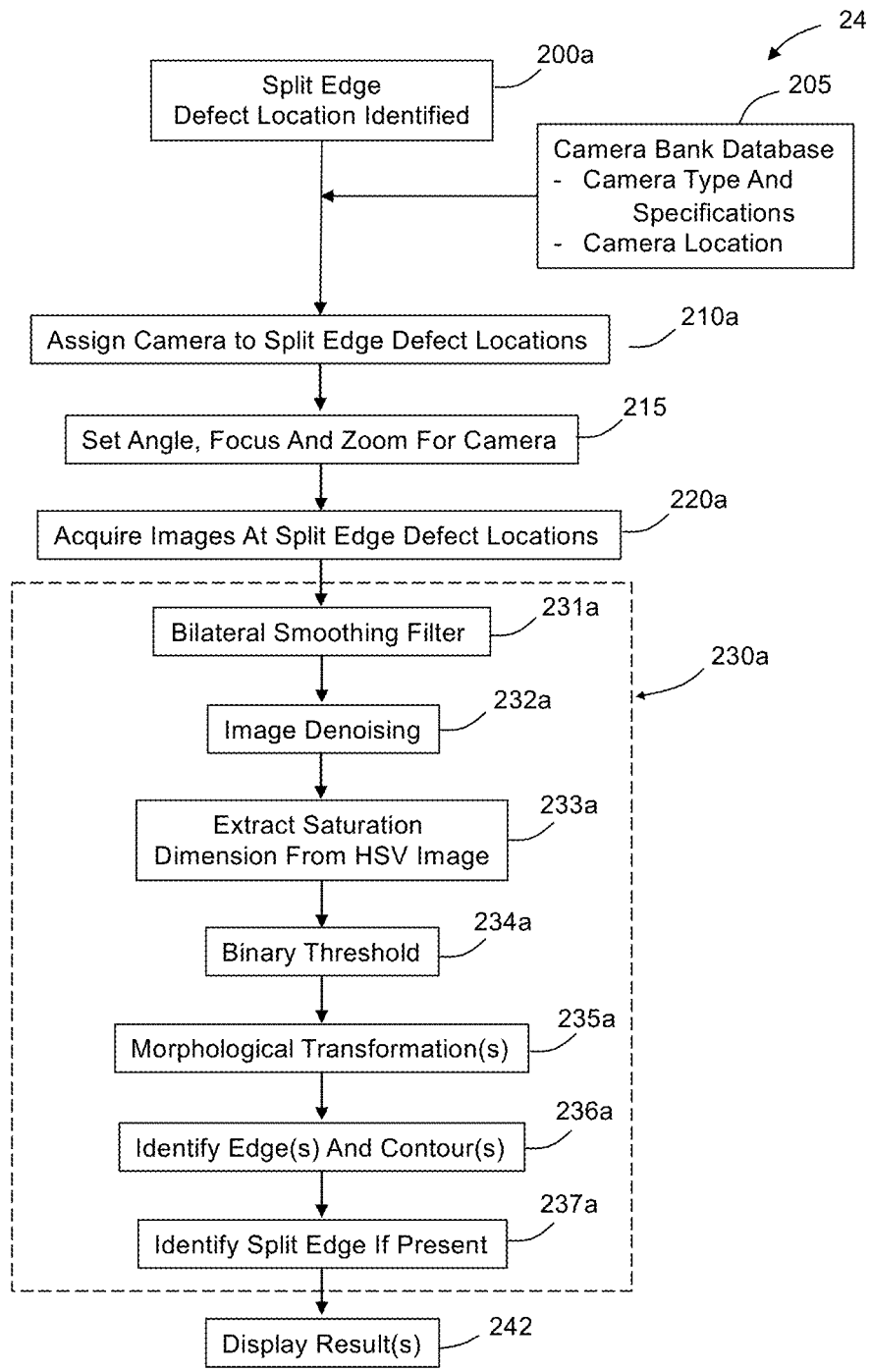
FIG. 5 is a flowchart for a method of monitoring split edge defects in stamped blanks on a stamping line according to one form of the present disclosure.

Referring now to FIGS. 5 and 6A-10B, a method 24 of inspecting stamped blanks on a stamping line according to still another form of the present disclosure is shown in FIG. 5 and example images resulting from executing the method 24 are shown in FIGS. 6A-10B. Particularly, the method 24 and the images shown in FIGS. 6A-10B are for inspecting and/or monitoring stamped blanks for split edge defects using a split edge effect algorithm.

The method 24 includes identifying a target defect location in the form of a split edge defect location at 200a and for a stamped blank have a stamped blank configuration as shown in FIG. 6A. As discussed above with respect to FIG. 4, in some variations the split edge defect location is identified as a function of input from at least one of CAE simulations of a given stamped blank configuration (202), prototype trials of stamping blanks per the given stamped blank configuration at (204), real time sensors on the stamping line and during a current stamping line run or campaign at (206), and information on the stamped blank (208). Based on the fact that a split edge defect location has been identified at 200a, one or more cameras (e.g., one camera) are assign to the split edge defect location at 210 and the selection of the one or more cameras is a function of information provided from the camera bank database at 205.

The angle, focus and zoom of the assigned camera(s) are set at 215. It should be understood that for method 24, the parameters of the camera such as the angle, focus and zoom, among others, are set in order to enhance split edge defect detection from images acquired by the camera(s). As stamped metal blanks move past or within the field of view of the camera(s), the camera(s) acquires images of the split edge defect location(s) on each stamped blank at 220a and analyzes the acquired at least one image for each stamped blank at 230a using a split edge defect algorithm. An example of an image of a split edge defect location of a stamped blank is shown in FIG. 6A. The image shown in FIG. 6A is an RGB image, and while it is an image of an entire side of the stamped blank, it should be understood that the image is taken as a function of or the purpose of identifying whether or not a split edge defect is present and thus an image of the edge of the stamped blank is acquired. It should also be understood that it some variations a split edge defect location would only include a portion of the edge of stamped blank.

The analysis 230a (i.e., the split edge defect algorithm) begins with subjecting the image shown in FIG. 6A to a bilateral smoothing filter at 231a in order to enhance the edges of the stamped blank. The image in FIG. 6A subjected to the bilateral smoothing filter is shown in FIG. 6B. For comparison, an enlarged view of section 'A' labeled in FIG. 6B is shown in FIG. 6C where bilateral smoothing was not performed and FIG. 6D where bilateral smoothing was performed. And as observed by the image in FIG. 6D, smoothing enhances the image contour or shape such that artificial defects on the edge are removed.

Figure 7A:
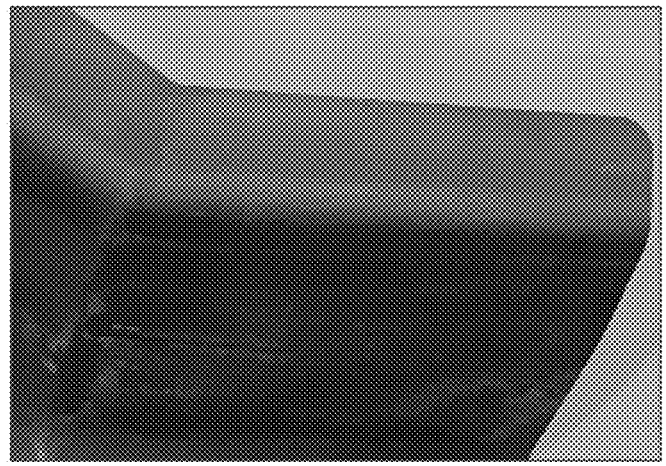
FIG. 7A is an enlarged view of a portion of the acquired image in FIG. 6A.
Figure 7B:
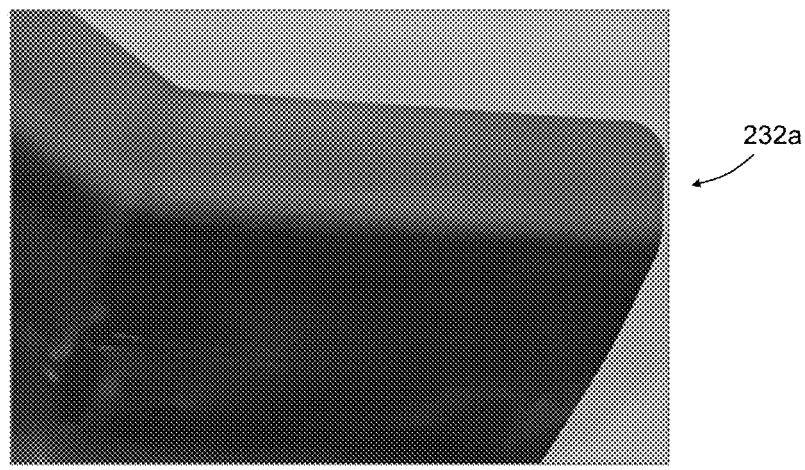
FIG. 7B is the image in FIG. 7A after being subjected to an image denoising filter.

The analysis 230a proceeds to 232a where image denoising is performed to enhance or estimate a "true" image of the split edge defect location by suppressing noise in the image. In some variations, non-local means denoising filtering is used to replace a color of a pixel with an average of the colors of similar pixels in the entire image. FIG. 7A shows an image of a portion of the image in FIG. 6A before image denoising and FIG. 7B shows an image of the same portion after image denoising. A comparison of the images in FIGS. 7A and 7B shows most of the "lighter" color pixels in FIG. 7A have been replaced with the "darker" color of the remainder of the image.

Figure 8A:
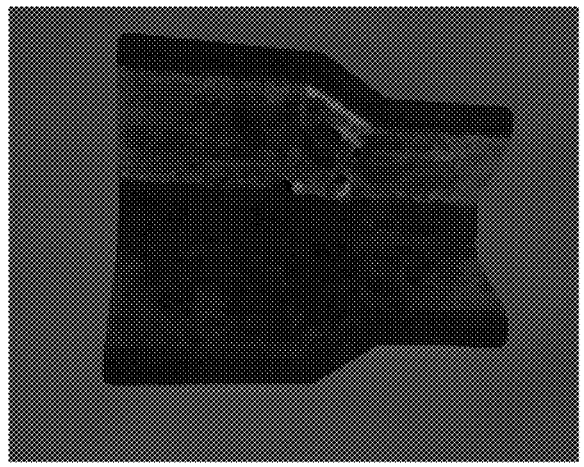
FIG. 8A is the acquired image in FIG. 6A after being subjected to a hue filter.
Figure 8B:
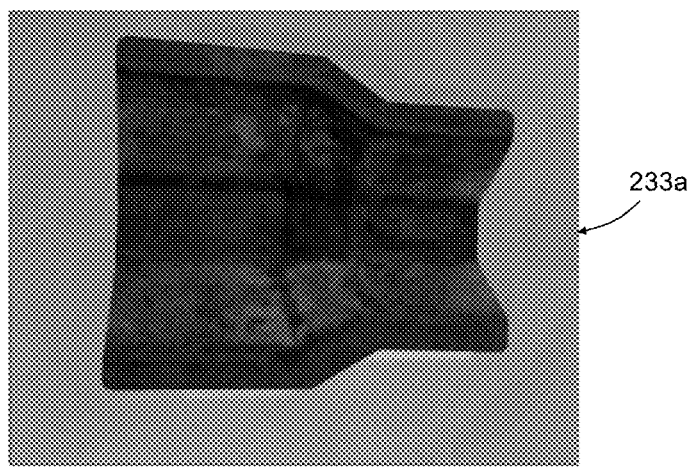
FIG. 8B is the acquired image in FIG. 6A after being subjected to a saturation filter.
Figure 8C:
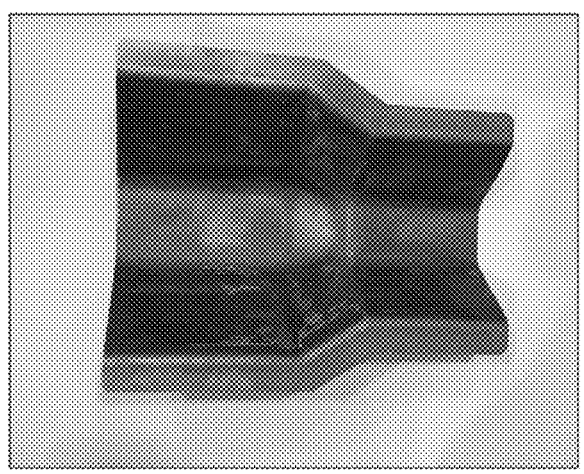
FIG. 8C is acquired image in FIG. 6A after being subjected to a value filter.

The analysis 230a proceeds to 233a where the RGB image in FIG. 6A is converted to an HSV (hue, saturation, value) image and the saturation dimension from the HSV image is extracted. FIG. 8A shows the hue dimension of the HSV image, FIG. 8B the saturation dimension of the HSV image, and FIG. 8C shows the value dimension of the HSV image.

Figure 9A:
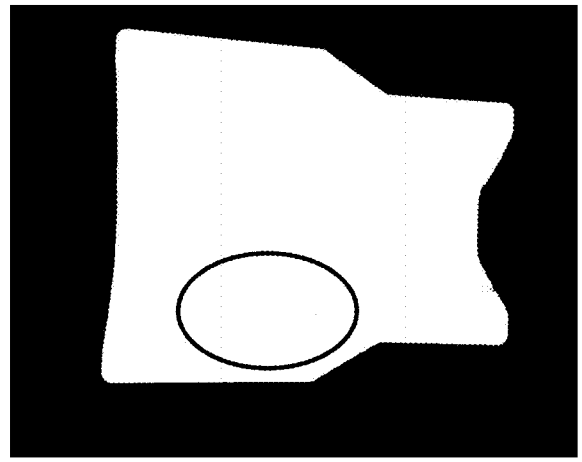
FIG. 9A is the acquired image in FIG. 6A after being subjected to a binary filter.
Figure 9B:
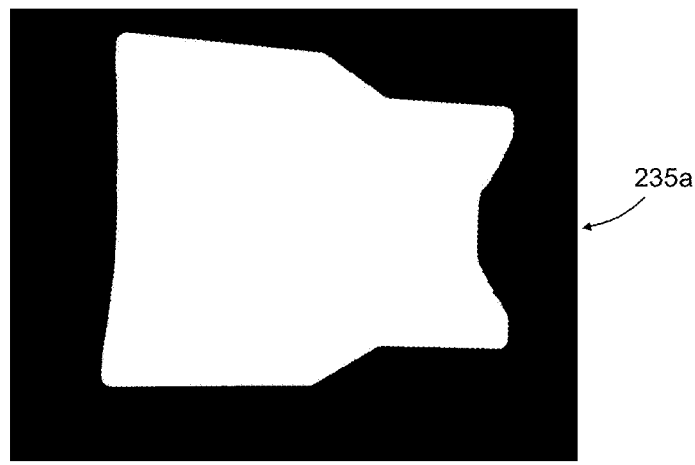
FIG. 9B is the image in FIG. 9A after being subjected to a morphological transformation filter.

The analysis 230a proceeds to 234a where the image obtained at 233a is subjected to a binary threshold conversion such that regions of the image corresponding to objects to be analyzed are separated from surrounding regions. The separation is based on the variation of intensity between pixels of the object to be analyzed (i.e., pixels of a target defect location) and pixels of the background. FIG. 9A shows an image of the binary threshold conversion. In some images, artifacts such as small "holes" are left in the binary image circled in FIG. 9A. Accordingly, a morphological transformation is performed at 235a where a structural kernel is applied to the image in FIG. 9A to provide the image in FIG. 9B.

Figure 10:
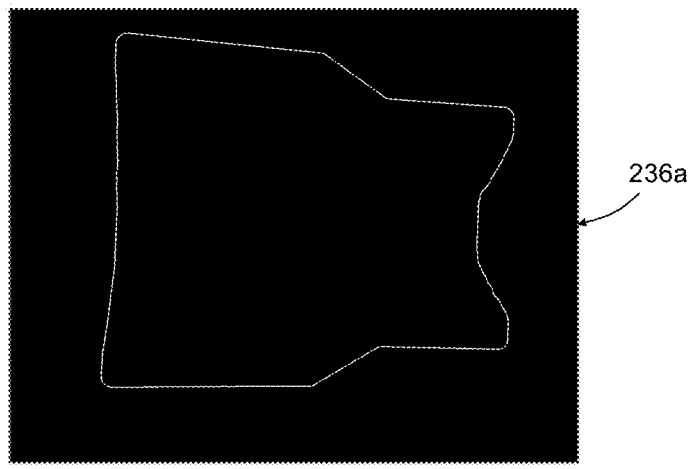
FIG. 10 is the image in FIG. 9B after being subjected to an edge and contour algorithm.

The analysis 230a proceeds to 236a where the image obtained at 235a is subjected to an edge and contour detection algorithm to provide the image shown in FIG. 10. For the image shown in FIG. 10, a simple canny detection algorithm was used to find the edges of the image in FIG. 9B. Contours are identified for an object and applied for continuous, thicker and clear representation of edges. And optionally, a "connect line" algorithm can be applied to fill or complete any discontinuities along an outer edge.

The analysis 230a proceeds to 237a where whether or not the image obtained at 236a shows a split edge defect is determined, after which the result is displayed at 242.

Figure 11A:
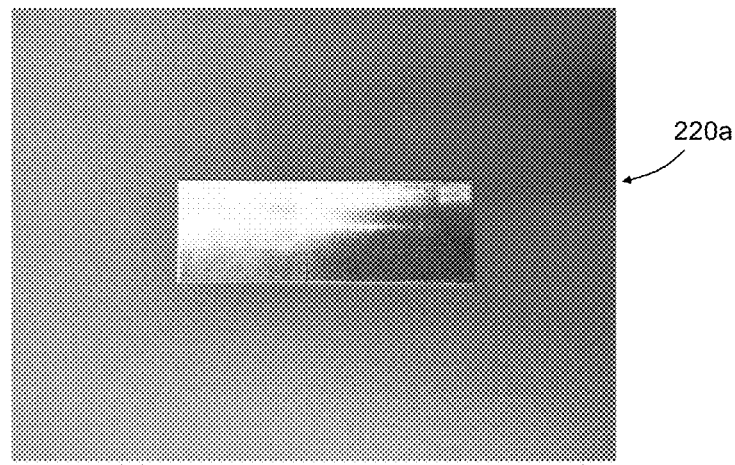
FIG. 11A is an acquired image of a stamped blank with a split edge.
Figure 11B:
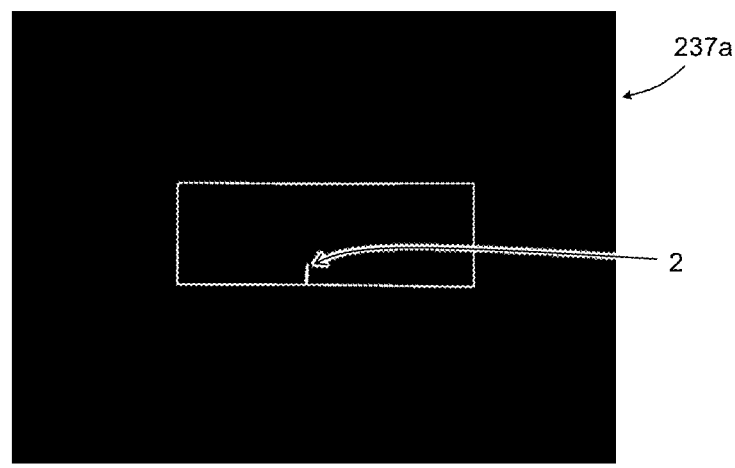
FIG. 11B is the acquired image in FIG. 11A after processing with a bilateral filter, a smoothing filter, a smoothing filter, a denoising filter, a saturation dimension filter, a morphological transformation filter, and an edge and contour algorithm.

As shown in FIG. 10 a clear image of the edge of the stamped blank is provided by analysis 230a and a split edge defect is not present on the stamped blank for which the image was acquired. However, and with reference to FIGS. 11A-11B, an example of a split edge defect detection is shown. Particularly, an acquired image of a piece of sheet metal with a split edge defect is shown in FIG. 11A, and processing of the image per the steps discussed above with respect to analysis 230a provided the image shown FIG. 11B. As shown in FIG. 11119B, the split edge defect 2 was detected at 237a of the method 24.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

The algorithms include processor-executable instructions that are stored on at least one non-transitory, tangible computer-readable medium. The algorithms may also include or rely on stored data. The algorithms may encompass a basic input/output system (BIOS) that interacts with hardware of the special purpose computer, device drivers that interact with particular devices of the special purpose computer, one or more operating systems, user applications, background services, background applications, etc.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and nontransitory. Non-limiting examples of a nontransitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of inspecting stamped blanks on a stamping line, the method comprising:
   identifying at least two target defect locations for a given stamped blank configuration, wherein a unique defect type is associated with each of the at least two target defect locations and the unique defect types are different defects, and wherein the identification of the at least two target defect locations comprises identifying the target defect locations on a set of data comprising:
      data populated from at least one of computer-aided engineering simulations,
      data populated from prototype stamping trials of blanks stamped per the given stamped blank configuration,
      data received from real time sensors during stamping of blanks per the given stamped blank configuration, and
      data indicative of physical properties of blanks being stamped per the given stamped blank configuration, mechanical properties of blanks being stamped per the given stamped blank configuration, and geometric dimensions of the given stamped blank configuration;
   acquiring one or more images of each of the at least two identified target defect locations on blanks stamped per the given stamped blank configuration with one or more cameras assigned to each of the identified target defect locations and as the stamped blanks move along the stamping line; and
   analyzing, with one or more defect identification algorithms from a plurality of defect identification algorithms, the one or more images of each of the at least two identified target defect locations and detecting if the unique defect type associated with each of the at least two target defect locations is present, wherein each unique defect type is identified with a different defect identification algorithm from the plurality of defect identification algorithms, and wherein each defect identification algorithm of the plurality of defect identification algorithms is used to identify a different unique defect type.

2. The method according to claim 1 further comprising assigning the one or more cameras to the identified target defect locations based on information regarding a plurality of cameras assigned to the stamping line.

3. The method according to claim 2, wherein the information regarding the plurality of cameras comprises locations of and specifications on the plurality of cameras on the stamping line.

4. The method according to claim 1 further comprising setting a camera angle, a focus, and a zoom for each of the assigned one or more cameras.

5. The method according to claim 1 further comprising displaying, on a display screen, the defects detected at the least one identified target defect location.

6. The method according to claim 1 further comprising updating a defect database.

7. The method according to claim 1 further comprising identifying a defect type and a defect location on blanks stamped per the given stamped blank configuration and having at least one defect.

8. The method according to claim 1, wherein the identified target defect locations comprise a first defect location with a first type of defect and a second defect location different than the first location with a second type of defect different than the first type of defect.

9. The method according to claim 8, wherein the one or more cameras comprises at least two cameras with a first camera assigned to and taking images of the first defect location and a second camera assigned to and taking images of the second defect location.

10. The method according to claim 9 further comprising a first defect type identification sub-system assigned to the first defect location and a second defect type identification sub-system assigned to the second defect location, wherein the first defect type identification sub-system comprises the first camera and a first unique defect identification algorithm and the second defect type identification sub-system comprises the second camera and a second unique defect identification algorithm different than the first unique defect identification algorithm.

11. The method according to claim 1 further comprising training each unique defect identification algorithm for the corresponding unique defect type.

12. The method according to claim 11, wherein training each unique defect identification algorithm further comprises:
   training a first unique defect identification algorithm for a split edge defect type associated with a split edge target location; and
   training a second unique defect identification algorithm for a wrinkle defect type associated with a wrinkle edge target location.

13. The method according to claim 12 further comprising a split edge defect identification algorithm configured to execute the following steps on an acquired image of the split edge target location:
   a) bilateral smoothing;
   b) image denoising;
   c) extraction of saturation dimension;
   d) binary thresholding;
   e) morphological transformation; and
   f) edge and contour identification.

14. The method according to claim 13 further comprising identifying a split edge defect on one of the stamped blanks moving along the stamping line, updating a defect database with a location of the identified split edge defect on the stamped blank, and displaying the location of the identified split edge defect on the stamped blank on a display screen on the stamping line.

15. A method of inspecting stamped blanks on a stamping line, the method comprising:
   identifying at least two target defect locations for a given stamped blank configuration, wherein a unique defect type is associated with each of the at least two target defect locations and the unique defect types are different defects, wherein at least one of the at least two target defect locations is a target split edge defect location;
   acquiring one or more images of the target split edge defect location on at least a subset of stamped blanks from among a plurality of stamped blanks using one or more cameras assigned to the target split edge defect location as the subset of stamped blanks move along a stamping line and through a field of view of the one or more cameras; and
   analyzing, with one or more defect identification algorithms from a plurality of defect identification algorithms, the one or more images of the target split edge defect location and detecting if a split edge defect at a target split defect location is present on one of the stamped blanks, wherein the split edge defect is identified using a split edge defect identification algorithm, and wherein each of the one or more defect identification algorithms of the plurality of defect identification algorithms is used to identify a different unique defect type, and further wherein the split edge defect identification algorithm is configured to detect the split edge defect by executing the following steps on an acquired image:
  a) bilateral smoothing,
  b) image denoising,
  c) extraction of saturation dimension,
  d) binary thresholding,
  e) morphological transformation, and
  f) edge and contour identification.

16. The method according to claim 15, wherein the at least two target defect locations further include a target wrinkle defect location, the method further comprises:
  acquiring one or more images of the target wrinkle defect location on at least another subset of stamped blanks from among the plurality of stamped blanks using other cameras assigned to the target wrinkle defect location as the stamped blanks move along the stamping line and through a field of view of the other cameras; and
  analyzing the one or more images of the target wrinkle defect location and detecting a wrinkle defect at a target wrinkle location on one of the stamped blanks using a wrinkle defect identification algorithm different than the split edge defect identification algorithm.

17. The method according to claim 15 further comprising displaying, on a display screen, the split edge defect detected at the target split defect location.

18. A method of inspecting stamped blanks on a stamping line, the method comprising:
  identifying at least two target defect locations for a given stamped blank configuration, wherein a unique defect type is associated with each of the at least two target defect locations and the unique defect types are different defects, wherein the at least two target defect locations includes a target split edge defect location and a target wrinkle defect location,
  acquiring one or more images of the target split edge defect location on at least a subset of stamped blanks from among a plurality of stamped blanks using one or more cameras assigned to the target split edge defect location as the subset of stamped blanks move along the stamping line and through a field of view of the one or more cameras; and
  analyzing, with one or more defect identification algorithms from a plurality of defect identification algorithms, the one or more images of the target split edge defect location and detecting if a split edge defect at a target split defect location is present on one of the stamped blanks, wherein the split edge defect is identified using a split edge defect identification algorithm, and wherein each of the one or more defect identification algorithms of the plurality of defect identification algorithms is used to identify a different unique defect type, and wherein the split edge defect identification algorithm detects the split edge defect by executing the following steps on the acquired image:
  a) bilateral smoothing;
  b) image denoising;
  c) extraction of saturation dimension;
  d) binary thresholding;
  e) morphological transformation; and
  f) edge and contour identification.

19. The method according to claim 18 further comprising:
  acquiring one or more images of the target wrinkle defect location on at least another subset of stamped blanks among the plurality of stamped blanks using other cameras assigned to the target wrinkle defect location as the other subset stamped blanks move along the stamping line and through a field of view of the other cameras; and
  analyzing the one or more images of the target wrinkle defect location and detecting a wrinkle defect at a target wrinkle location on one of the stamped blanks using a wrinkle defect identification algorithm different than the split edge defect identification algorithm.

20. The method according to claim 18 further comprising displaying, on a display screen, the split edge defect detected at the target split defect location.

* * * * *